(12) United States Patent
Abdo et al.

(10) Patent No.: US 7,969,900 B2
(45) Date of Patent: Jun. 28, 2011

(54) DETERMINATION OF NETWORK PERFORMANCE CHARACTERISTICS

(75) Inventors: Miguel Abdo, Gulfport, FL (US); Greg Munroe, Largo, FL (US); William H. Venz, Seminole, FL (US)

(73) Assignee: Paradyne Corporation, Largo, FL (US)

( * ) Notice: Subject to any disclaimer, the term of this patent is extended or adjusted under 35 U.S.C. 154(b) by 963 days.

(21) Appl. No.: 10/515,222

(22) PCT Filed: Jun. 24, 2003

(86) PCT No.: PCT/US03/19998
§ 371 (c)(1),
(2), (4) Date: Nov. 19, 2004

(87) PCT Pub. No.: WO04/001553
PCT Pub. Date: Dec. 31, 2003

(65) Prior Publication Data
US 2006/0159025 A1    Jul. 20, 2006

Related U.S. Application Data

(60) Provisional application No. 60/391,098, filed on Jun. 24, 2002, provisional application No. 60/391,121, filed on Jun. 24, 2002, provisional application No. 60/391,053, filed on Jun. 24, 2002.

(51) Int. Cl.
*G01R 31/08* (2006.01)
(52) U.S. Cl. .......................................... 370/252; 370/249
(58) Field of Classification Search .................. None
See application file for complete search history.

(56) References Cited

U.S. PATENT DOCUMENTS

| | | | | |
|---|---|---|---|---|
| 6,145,088 | A * | 11/2000 | Stevens | 714/2 |
| 6,360,076 | B1 * | 3/2002 | Segura et al. | 455/67.11 |
| 6,587,438 | B1 * | 7/2003 | Brendel | 370/238 |
| 6,965,573 | B1 * | 11/2005 | Mizukoshi | 370/252 |
| 2002/0013838 | A1 * | 1/2002 | Kushida et al. | 709/223 |
| 2003/0169741 | A1 * | 9/2003 | Torsner et al. | 370/394 |
| 2005/0239476 | A1 * | 10/2005 | Betrabet et al. | 455/456.1 |
| 2006/0239204 | A1 * | 10/2006 | Bordonaro et al. | 370/253 |

OTHER PUBLICATIONS

U.S. Publication No. 2004/0052257, entitled "Automatic Discovery of Network Core Type", published Mar. 18, 2004.
U.S. Publication No. 2004/0264389 entitled "Automatic Discovery of Network Node Addresses", published Dec. 30, 2004.
RFC 792: Internet Control Message Protocol: Darpa Internet Program Protocol Specification (Available at ftp://ftp.rfc-editor.org/in-notes/rfc792.txt); J. Postel; Sep. 1981; pp. 1-21.
RFC 1256: ICMP Router Discovery Messages (Available at ftp://ftp.rfc-editor.org/in-notes/rfc1256.txt); S. Deering, Editor, Sep. 1991; pp. 1-19.

(Continued)

*Primary Examiner* — Kwang B Yao
*Assistant Examiner* — Jutai Kao
(74) *Attorney, Agent, or Firm* — Thomas, Kayden, Horstemeyer & Risley, LLP

(57) ABSTRACT

Systems and methods for testing network performance and communicating network device information are disclosed. The preferred embodiments of the present invention enhance the standard ICMP echo or ping protocol, while still maintaining backward compatibility. Furthermore, the network performance testing can be based on different qualities of service or types of service. This allows the network testing to be useful in real-time applications such as voice and/or video.

56 Claims, 2 Drawing Sheets

OTHER PUBLICATIONS

RFC 1393: Traceroute Using an IP Option (Available at ftp://ftp.rfc-editor.org/in-notes/rfc1393.txt ); G. Malkin, Xylogics, Inc.; Jan. 1993; pp. 1-7.
RFC 1885: Internet Control Message Protocol (ICMPv6) for the Internet Protocol Version 6 (IPv6) Specification (Available at ftp://ftp.rfc-editor.org/in-notes/rfc2885.txt ); A. Conta; Digital Equipment Corporation; S. Deering; Xexox PARC; Dec. 1995; pp. 1-20.
RFC 2463: Internet Protocol Message Protocol (ICMPv6) for the Internet Protocol Version 6 (IPv6) Specification (Available at ftp://ftp.rfc-editor.org/in-notes/rfc1885.txt ); A. Conta; Luncent; S Deering; Cisco Systems, Dec. 1998; pp. 1-18.
RFC 3531: A Flexible Method for Managing the Assignment of Bits of an IPv6 Address Block (Available at ftp://ftp.isi.edu/in-notes/rfc3531.txt); Marc Blanchet; Apr. 2003; pp. 1-7.
RFC 1332: The PPP Internet Protocol Control Protocol (IPCP) (Available at ftp://ftp.isi.edu/in-notes/rfc1332.txt); Glenn McGregor; May 1992; pp. 1-12.
RFC 1333: PPP Link Quality Monitoring (Available at ftp://ftp.isi.edu/in-notes/rfc1333.txt); William Allen Simpson; May 1992; pp. 1-15.
RFC 1764: The PPP XNS IDP Control Protocol (XNSCP) (Available at ftp://ftp.isi.edu/in-notes/rfc1764.txt); Steven J. Senum; Mar. 1995; pp. 1-5.
RFC 1788: ICMP Domain Name Messages (Available at ftp://ftp.isi.edu/in-notes/rfc1788.txt); William Allen Simpson; Apr. 1995; pp. 1-7.
RFC 1944: Benchmarking Methodology for Network Interconnect Devices (Available at ftp://ftp.isi.edu/in-notes/rfc1944.txt); Scott Bradner and Jim McQuaid, Editors; May 1996; pp. 1-30.
RFC 1963: PPP Serial Data Transport Protocol (SDTP) (Available at ftp://ftp.isi.edu/in-notes/rfc1963.txt); Kevin Schneider and Stuart Venters; Aug. 1996; pp. 1-20.
RFC 2467: Transmission of IPv6 Packets over FDDI Networks (Available at ftp://ftp.isi.edu/in-notes/rfc2467.txt); Matt Crawford; Dec. 1998; pp. 1-9.
RFC 2470: Transmission of IPv6 Packets over Token Ring Networks (Available at ftp://ftp.isi.edu/in-notes/rfc2470.txt); Matt Crawford, Thomas Narten, and Stephen Thomas; Dec. 1998; pp. 1-11.
RFC 2979: Behavior of and Requirements for Internet Firewalls (Available at ftp://ftp.isi.edu/in-notes/rfc2979.txt); Ned Freed; Oct. 2000; pp. 1-7.
RFC 2993: Architectural Implications of NAT (Available at ftp://ftp.isi.edu/in-notes/rfc2993.txt); Tony Hain; Nov. 2000; pp. 1-29.
RFC 3133: Terminology for Frame Relay Benchmarking (Available at ftp://ftp.isi.edu/in-notes/rfc3133.txt); Jeffrey Dunn and Cynthia Martin; Jun. 2001; pp. 1-24.
RFC 3134: Terminology for ATM ABR Benchmarking (Available at ftp://ftp.isi.edu/in-notes/rfc3134.txt); Jeffrey Dunn and Cynthia Martin; Jun. 2001; pp. 1-16.
RFC 1483: Multiprotocol Encapsulation over ATM Adaptation Layer 5 (Available at ftp://ftp.isi.edu/in-notes/rfc1483.txt); Juha Heinanen; Jul. 1993; pp. 1-16.
RFC 1490: Multiprotocol Interconnect over Frame Relay (Available at ftp://ftp.isi.edu/in-notes/rfc1490.txt); Terry Bradley, Caralyn Brown, and Andrew G. Malis; Jul. 1993; pp. 1-35.
RFC 1547: Requirements for an Internet Standard Point-to-Point Protocol (Available at ftp://ftp.isi.edu/in-notes/rfc1547.txt); Drew Perkins; Dec. 1993; pp. 1-21.
RFC 1548: The Point-to-Point Protocol (PPP) (Available at ftp://ftp.isi.edu/in-notes/rfc1548.txt); William Allen Simpson; Dec. 1993; pp. 1-53.
RFC 1549: PPP in HDLC Framing (Available at ftp://ftp.isi.edu/in-notes/rfc1549.txt); William Allen Simpson, Editor; Dec. 1993; pp. 1-18.
RFC 1552: The PPP Internetwork Packet Exchange Control Protocol (IPXCP) (Available at ftp://ftp.isi.edu/in-notes/rfc1552.txt); William Allen Simpson; Dec. 1993; pp. 1-16.
RFC 1577: Classical IP and ARP over ATM (Available at ftp://ftp.isi.edu/in-notes/rfc1577.txt); Mark Laubach; Jan. 1994; pp. 1-17.
RFC 1579: Firewall-Friendly FTP (Available at ftp://ftp.isi.edu/in-notes/rfc1579.txt); Steven M. Bellovin; Feb. 1994; pp. 1-4.
RFC 1597: Address Allocation for Private Internets (Available at ftp://ftp.isi.edu/in-notes/rfc1597.txt); Yakov Rekhter, Robert G Moskowitz, Daniel Karrenberg, and Geert Jan de Groot; Mar. 1994; pp. 1-8.
RFC 1598: PPP in X.25 (Available at ftp://ftp.isi.edu/in-notes/rfc1598.txt); William Allen Simpson; Mar. 1994; pp. 1-7.
RFC 1613: cisco Systems X.25 over TCP (XOT) (Available at ftp://ftp.isi.edu/in-notes/rfc1613.txt); James R. Forster, Greg Satz, Gilbert Glick, and Bob Day; May 1994; pp. 1-13.
RFC 1618: PPP over ISDN (Available at ftp://ftp.isi.edu/in-notes/rfc1618.txt); William Allen Simpson; May 1994; pp. 1-6.
RFC 1619: PPP over SONET/SDH (Available at ftp://ftp.isi.edu/in-notes/rfc1619.txt); William Allen Simpson; May 1994; pp. 1-4.
RFC 1627: Network 10 Considered Harmful (Some Practices Shouldn't be Codified) (Available at ftp://ftp.isi.edu/in-notes/rfc1627.txt); Eliot Lear, Erik Fair, Dave Crocker, and Thomas Kessler; Jul. 1994; pp. 1-8.
RFC 1631: The IP Network Address Translator (NAT) (Available at ftp://ftp.isi.edu/in-notes/rfc1631.txt); Kjeld Borch Egevang and Paul Francis; May 1994; pp. 1-10.
RFC 1638: PPP Bridging Control Protocol (BCP) (Available at ftp://ftp.isi.edu/in-notes/rfc1638.txt); Fred Baker and Rich Bowen, Editors; Jun. 1994; pp. 1-28.
RFC 1661: The Point-to-Point Protocol (PPP) (Available at ftp://ftp.isi.edu/in-notes/rfc1661.txt); William Allen Simpson; Jul. 1994; pp. 1-52.
RFC 1662: PPP in HDLC-like Framing (Available at ftp://ftp.isi.edu/in-notes/rfc1662.txt); William Allen Simpson; Jul. 1994; pp. 1-25.
RFC 1970: Neighbor Discovery for IP Version 6 (IPv6) (Available at ftp://ftp.isi.edu/in-notes/rfc1970.txt); Erik Nordmark, Thomas Narten, and William Allen Simpson; Aug. 1996; pp. 1-82.
RFC 1972: A Method for the Transmission of IPv6 Packets over Ethernet Networks (Available at ftp://ftp.isi.edu/in-notes/rfc1972.txt); Matt Crawford; Aug. 1996; pp. 1-4.
RFC 1973: PPP in Frame Relay (Available at ftp://ftp.isi.edu/in-notes/rfc1973.txt); William Allen Simpson; Jun. 1996; pp. 1-8.
RFC 1989: PPP Link Quality Monitoring (Available at ftp://ftp.isi.edu/in-notes/rfc1989.txt); William Allen Simpson; Aug. 1996; pp. 1-16.
RFC 1990: The PPP Multilink Protocol (MP) (Available at ftp://ftp.isi.edu/in-notes/rfc1990.txt); Keith Sklower, Brian Lloyd, Glenn McGregor, Dave Carr, and Tom Coradetti; Aug. 1996; pp. 1-24.
RFC 2003: IP Encapsulation within IP (Available at ftp://ftp.isi.edu/in-notes/rfc2003.txt); Charles Perkins; Oct. 1996; pp. 1-14.
RFC 2004: Minimal Encapsulation within IP (Available at ftp://ftp.isi.edu/in-notes/rfc2004.txt); Charles Perkins; Oct. 1996; pp. 1-6.
RFC 2019: A Method for the Transmission of IPv6 Packets over FDDI Networks (Available at ftp://ftp.isi.edu/in-notes/rfc2019.txt); Matt Crawford; Oct. 1996; pp. 1-6.
RFC 2023: IP Version 6 over PPP (Available at ftp://ftp.isi.edu/in-notes/rfc2023.txt); Dimitry Haskin and Ed Allen; Oct. 1996; pp. 1-10.
RFC 2043: The PPP SNA Control Protocol (SNACP) (Available at ftp://ftp.isi.edu/in-notes/rfc2043.txt); Andrew M. Fuqua; Oct. 1996; pp. 1-7.
RFC 2073: An IPv6 Provider-Based Unicast Address Format (Available at ftp://ftp.isi.edu/in-notes/rfc2073.txt); Yakov Rekhter, Peter Lothberg, Robert M. Hinden, Stephen E. Deering, and Jon Postel, Editors; Jan. 1997; pp. 1-7.
RFC 2097: The PPP NetBIOS Frames Control Protocol (NBFCP) (Available at ftp://ftp.isi.edu/in-notes/rfc2097.txt); Gurdeep Singh Pall; Jan. 1997; pp. 1-13.
RFC 2101: IPv4 Address Behaviour Today (Available at ftp://ftp.isi.edu/in-notes/rfc2101.txt); Brian E. Carpenter, Jon Crowcroft, and Yakov Rekhter; Feb. 1997; pp. 1-13.
RFC 2105: Cisco Systems' Tag Switching Architecture Overview (Available at ftp://ftp.isi.edu/in-notes/rfc2105.txt); Yakov Rekhter, Bruce Davie, Dave Katz, Eric Rosen, and George Swallow; Feb. 1997; pp. 1-13.
RFC 2107: Ascend Tunnel Management Protocol—ATMP (Available at ftp://ftp.isi.edu/in-notes/rfc2107.txt); Kory Hamzeh; Feb. 1997; pp. 1-21.

RFC 2151: A Primer on Internet and TCP/IP Tools and Utilities (Available at ftp://ftp.isi.edu/in-notes/rfc2151.txt); Gary C. Kessler and Steven D. Shepard; Jun. 1997; pp. 1-52.
RFC 2185: Routing Aspects of IPv6 Transition (Available at ftp://ftp.isi.edu/in-notes/rfc2185.txt); Ross Callon and Dimitry Haskin; Sep. 1997; pp. 1-13.
RFC 2225: Classical IP and ARP over ATM (Available at ftp://ftp.isi.edu/in-notes/rfc2225.txt); Mark Laubach and Joel Halpern; Apr. 1998; pp. 1-28.
RFC 2544: Benchmarking Methodology for Network Interconnect Devices (Available at ftp://ftp.isi.edu/in-notes/rfc2544.txt); Scott Bradner and Jim McQuaid, Editors; Mar. 1999; pp. 1-31.
RFC 2547: BGP/MPLS VPNs (Available at ftp://ftp.isi.edu/in-notes/rfc2547.txt); Eric C. Rosen and Yakov Rekhter; Mar. 1999; pp. 1-25.
RFC 2590: Transmission of IPv6 Packets over Frame Relay Networks Specification (Available at ftp://ftp.isi.edu/in-notes/rfc2590.txt); Alex Conta, Andrew Malis, and Martin Mueller; May 1999; pp. 1-19.
RFC 2615: PPP over SONET/SDH (Available at ftp://ftp.isi.edu/in-notes/rfc2615.txt); Andrew G. Malis and William Allen Simpson; Jun. 1999; pp. 1-10.
RFC 2637: Point-to-Point Tunneling Protocol (PPTP) (Available at ftp://ftp.isi.edu/in-notes/rfc2637.txt); Kory Hamzeh, Gurdeep Singh Pall, William Verthein, Jeff Taarud, W. Andrew Little, and Glen Zorn; Jul. 1999; pp. 1-57.
RFC 2647: Benchmarking Terminology for Firewall Performance (Available at ftp://ftp.isi.edu/in-notes/rfc2647.txt); David Newman; Aug. 1999; pp. 1-26.
RFC 2661: Layer Two Tunneling Protocol "L2TP" (Available at ftp://ftp.isi.edu/in-notes/rfc2661.txt); Gurdeep Singh Pall, Bill Palter, Allan Rubens, W. Mark Townsley, Andrew J. Valencia, and Glen Zorn; Aug. 1999; pp. 1-80.
RFC 2663: IP Network Address Translator (NAT) Terminology and Considerations (Available at ftp://ftp.isi.edu/in-notes/rfc2663.txt); Pyda Srisuresh and Matt Holdrege; Aug. 1999; pp. 1-30.
RFC 2684: Multiprotocol Encapsulation over ATM Adaptation Layer 5 (Available at ftp://ftp.isi.edu/in-notes/rfc2684.txt); Dan Grossman and Juha Heinanen; Sep. 1999; pp. 1-23.
RFC 2685: Virtual Private Networks Identifier (Available at ftp://ftp.isi.edu/in-notes/rfc2685.txt); Barbara A. Fox and Bryan Gleeson; Sep. 1999; pp. 1-6.
RFC 2694: DNS extensions to Network Address Translators (DNS_ALG) (Available at ftp://ftp.isi.edu/in-notes/rfc2694.txt); Pyda Srisuresh, George Tsirtsis, Praveen Akkiraju, and Andy Heffernan; Sep. 1999; pp. 1-29.
RFC 2702: Requirements for Traffic Engineering Over MPLS (Available at ftp://ftp.isi.edu/in-notes/rfc2702.txt); Daniel O. Awduche, Joe Malcolm, Johnson Agogbua, Mike O'Dell, and Jim McManus; Sep. 1999; pp. 1-29.
RFC 2709: Security Model with Tunnel-mode IPsec for NAT Domains (Available at ftp://ftp.isi.edu/in-notes/rfc2709.txt); Pyda Srisuresh; Oct. 1999; pp. 1-11.
RFC 2761: Terminology for ATM Benchmarking (Available at ftp://ftp.isi.edu/in-notes/rfc2761.txt); Jeffrey Dunn and Cynthia Martin; Feb. 2000; pp. 1-32.
RFC 2764: A Framework for IP Based Virtual Private Networks (Available at ftp://ftp.isi.edu/in-notes/rfc2764.txt); Bryan Gleeson, Juha Heinanen, Arthur Lin, Grenville Armitage, and Andrew G. Malis; Feb. 2000; pp. 1-62.
RFC 2765: Stateless IP/ICMP Translation Algorithm (SIIT) (Available at ftp://ftp.isi.edu/in-notes/rfc2765.txt); Erik Nordmark; Feb. 2000; pp. 1-26.
RFC 2766: Network Address Translation—Protocol Translation (NAT-PT) (Available at ftp://ftp.isi.edu/in-notes/rfc2766.txt); George Tsirtsis and Pyda Srisuresh; Feb. 2000; pp. 1-21.
RFC 2775: Internet Transparency (Available at ftp://ftp.isi.edu/in-notes/rfc2775.txt); Brian E. Carpenter; Feb. 2000; pp. 1-18.
RFC 3142: An IPv6-to-IPv4 Transport Relay Translator (Available at ftp://ftp.isi.edu/in-notes/rfc3142.txt); Jun-ichiro itojun Hagino and Kazu Yamamoto; Jun. 2001; pp. 1-11.
RFC 3177: IAB/IESG Recommendations on IPv6 Address Allocations to Sites (Available at ftp://ftp.isi.edu/in-notes/rfc3177.txt); Internet Architecture Board (IAB) and Internet Engineering Steering Group (IESG); Sep. 2001; pp. 1-10.
RFC 3193: Securing L2TP using IPsec (Available at ftp://ftp.isi.edu/in-notes/rfc3193.txt); Baiju V. Patel, Bernard Aboba, William Dixon, Glen Zorn, and Skip Booth; Nov. 2001; pp. 1-28.
RFC 3232: Assigned Numbers: RFC 1700 is Replaced by an On-line Database (Available at ftp://ftp.isi.edu/in-notes/rfc3232.txt); Joyce K. Reynolds, Editor; Jan. 2002; pp. 1-3.
RFC 3235: Network Address Translator (NAT)-Friendly Application Design Guidelines (Available at ftp://ftp.isi.edu/in-notes/rfc3235.txt); Daniel Senie; Jan. 2002; pp. 1-13.
RFC 3257: Stream Control Transmission Protocol Applicability Statement (Available at ftp://ftp.isi.edu/in-notes/rfc3257.txt); Lode Coene; Apr. 2002; pp. 1-13.
RFC 3286: An Introduction to the Stream Control Transmission Protocol (SCTP) (Available at ftp://ftp.isi.edu/in-notes/rfc3286.txt); Lyndon Ong and John Yoakum; May 2002; pp. 1-10.
RFC 3301: Layer Two Tunnelling Protocol (L2TP): ATM access network extensions (Available at ftp://ftp.isi.edu/in-notes/rfc3301.txt); Yves T'joens, Paolo Crivellari, and Bernard Sales; Jun. 2002; pp. 1-19.
RFC 3303: Middlebox communication architecture and framework (Available at ftp://ftp.isi.edu/in-notes/rfc3303.txt); Pyda Srisuresh, Jiri Kuthan, Jonathan Rosenberg, Andrew Molitor, and Abdallah Rayhan; Aug. 2002; pp. 1-34.
RFC 3304: Middlebox Communications (midcom) Protocol Requirements (Available at ftp://ftp.isi.edu/in-notes/rfc3304.txt); Richard Swale, Paul Sijben, Philip Mart, Scott Brim, and Melinda Shore; Aug. 2002; pp. 1-9.
RFC 3308: Layer Two Tunneling Protocol (L2TP) Differentiated Services Extension (Available at ftp://ftp.isi.edu/in-notes/rfc3308.txt); Pat R. Calhoun, Wei Luo, Danny McPherson, and Ken Peirce; Nov. 2002; pp. 1-10.
RFC 3309: Stream Control Transmission Protocol (SCTP) Checksum Change (Available at ftp://ftp.isi.edu/in-notes/rfc3309.txt); Jonathan Stone, Randall R. Stewart, and Douglas Otis; Sep. 2002; pp. 1-17.
RFC 3336: PPP Over Asynchronous Transfer Mode Adaptation Layer 2 (AAL2) (Available at ftp://ftp.isi.edu/in-notes/rfc3336.txt); Bruce Thompson, Tmima Koren, and Bruce Buffam; Dec. 2002; pp. 1-16.
RFC 3337: Class Extensions for PPP over Asynchronous Transfer Mode Adaptation Layer 2 (AAL2) (Available at ftp://ftp.isi.edu/in-notes/rfc3337.txt); Bruce Thompson, Bruce Buffam, and Tmima Koren; Dec. 2002; pp. 1-7.
RFC 3346: Applicability Statement for Traffic Engineering with MPLS (Available at ftp://ftp.isi.edu/in-notes/rfc3346.txt); Jim Boyle, Vijay Gill, Alan Hannan, Dave Cooper, Daniel O. Awduche, Blaine Christian, and Wai Sum Lai; Aug. 2002; pp. 1-14.
RFC 3348: Layer Two Tunneling Protocol (L2TP) Internet Assigned Numbers Authority (IANA) Considerations Update (Available at ftp://ftp.isi.edu/in-notes/rfc3348.txt); Mike Gahrns and Raymond Cheng; Jul. 2002; pp. 1-6.
RFC 3378: EtherIP: Tunneling Ethernet Frames in IP Datagrams (Available at ftp://ftp.isi.edu/in-notes/rfc3378.txt); Russell Housley and Scott Hollenbeck; Sep. 2002; pp. 1-9.
RFC 3424: IAB Considerations for UNilateral Self-Address Fixing (UNSAF) Across Network Address Translation (Available at ftp://ftp.isi.edu/in-notes/rfc3424.txt); Leslie Daigle, Editor; Nov. 2002; pp. 1-9.
RFC 1122: Requirements for Internet Hosts—Communication Layers (Available at ftp://ftp.isi.edu/in-notes/rfc1122.txt); The Internet Engineering Task Force; Editor: Robert Braden; Oct. 1989; pp. 1-116.
RFC 1134: The Point-to-Point Protocol: A Proposal for Multi-Protocol Transmission of Datagrams Over Point-to-Point Links (Available at ftp://ftp.isi.edu/in-notes/rfc1134.txt); Drew D. Perkins; Nov. 1989; pp. 1-38.
RFC 1171: The Point-to-Point Protocol for the Transmission of Multi-Protocol Datagrams Over Point-to-Point Links (Available at ftp://ftp.isi.edu/in-notes/rfc1171.txt); Drew D. Perkins; Jul. 1990; pp. 1-48.

RFC 1172: The Point-to-Point Protocol (PPP) Initial Configuration Options (Available at ftp://ftp.isi.edu/in-notes/rfc1172.txt); Drew D. Perkins and Russ Hobby; Jul. 1990; pp. 1-38.
RFC 1188: A Proposed Standard for the Transmission of IP Datagrams over FDDI Networks (Available at ftp://ftp.isi.edu/in-notes/rfc1188.txt); Dave Katz; Oct. 1990; pp. 1-11.
RFC 1201: Transmitting IP Traffic over ARCNET Networks (Available at ftp://ftp.isi.edu/in-notes/rfc1201.txt); Don Provan; Feb. 1991; pp. 1-7.
RFC 1209: The Transmission of IP Datagrams over the SMDS Service (Available at ftp://ftp.isi.edu/in-notes/rfc1209.txt); Dave Piscitello and Joseph Lawrence; Mar. 1991; pp. 1-11.
RFC 1220: Point-to-Point Protocol Extensions for Bridging (Available at ftp://ftp.isi.edu/in-notes/rfc1220.txt); Fred Baker; Apr. 1991; pp. 1-18.
RFC 1226: Internet Protocol Encapsulation of AX.25 Frames (Available at ftp://ftp.isi.edu/in-notes/rfc1226.txt); Brian Kantor; May 1991; pp. 1-2.
RFC 1234: Tunneling IPX Traffic through IP Networks (Available at ftp://ftp.isi.edu/in-notes/rfc1234.txt); Don Provan; Jun. 1991; pp. 1-6.
RFC 1241: A Scheme for an Internet Encapsulation Protocol: Version 1 (Available at ftp://ftp.isi.edu/in-notes/rfc1241.txt); Robert A. Woodburn and David L. Mills; Jul. 1991; pp. 1-17.
RFC 1242: Benchmarking Terminology for Network Interconnection Devices (Available at ftp://ftp.isi.edu/in-notes/rfc1242.txt); Scott Bradner, Editor; Jul. 1991; pp. 1-12.
RFC 1293: Inverse Address Resolution Protocol (Available at ftp://ftp.isi.edu/in-notes/rfc1293.txt); Terry Bradley and Caralyn Brown; Jan. 1992; pp. 1-6.
RFC 1294: Multiprotocol Interconnect over Frame Relay (Available at ftp://ftp.isi.edu/in-notes/rfc1294.txt); Terry Bradley, Caralyn Brown, and Andrew G. Malis; Jan. 1992; pp. 1-28.
RFC 1326: Mutual Encapsulation Considered Dangerous (Available at ftp://ftp.isi.edu/in-notes/rfc1326.txt);Paul Tsuchiya; May 1992; pp. 1-5.
RFC 1329: Thoughts on Address Resolution for Dual MAC FDDI Networks (Available at ftp://ftp.isi.edu/in-notes/rfc1329.txt); Peter Kuehn; May 1992; pp. 1-28.
RFC 1331: The Point-to-Point Protocol (PPP) for the Transmission of Multi-protocol Datagrams over Point-to-Point Links (Available at ftp://ftp.isi.edu/in-notes/rfc1331.txt);William Allen Simpson; May 1992; pp. 1-66.
RFC 1335: A Two-Tier Address Structure for the Internet: A Solution to the Problem of Address Space Exhaustion (Available at ftp://ftp.isi.edu/in-notes/rfc1335.txt); Zheng Wang and Jon Crowcroft; May 1992; pp. 1-7.
RFC 1356: Multiprotocol Interconnect on X.25 and ISDN in the Packet Mode (Available at ftp://ftp.isi.edu/in-notes/rfc1356.txt); Andrew G. Malis, David Robinson, and Robert L. Ullmann; Aug. 1992; pp. 1-14.
RFC 1376: The PPP DECnet Phase IV Control Protocol (DNCP) (Available at ftp://ftp.isi.edu/in-notes/rfc1376.txt); Steven J. Senum; Nov. 1992; pp. 1-6.
RFC 1377: The PPP OSI Network Layer Control Protocol (OSINLCP) (Available at ftp://ftp.isi.edu/in-notes/rfc1377.txt); Dave Katz; Nov. 1992; pp. 1-10.
RFC 1378: The PPP AppleTalk Control Protocol (ATCP) (Available at ftp://ftp.isi.edu/in-notes/rfc1378.txt); Brad Parker; Nov. 1992; pp. 1-16.
RFC 1381: SNMP MIP Extension for X.25 LAPB (Available at ftp://ftp.isi.edu/in-notes/rfc1381.txt); Dean D. Throop and Fred Baker; Nov. 1992; pp. 1-33.
RFC 1382: SNMP MIB Extension for the X.25 Packet Layer (Available at ftp://ftp.isi.edu/in-notes/rfc1382.txt); Dean D. Throop, Editor; Nov. 1992; pp. 1-69.
RFC 1390: Transmission of IP and ARP over FDDI Networks (Available at ftp://ftp.isi.edu/in-notes/rfc1390.txt); Dave Katz; Jan. 1993; pp. 1-11.
RFC 1479: Inter-Domain Policy Routing Protocol Specification: Version 1 (Available at ftp://ftp.isi.edu/in-notes/rfc1479.txt); Martha Steenstrup; Jul. 1993; pp. 1-108.

RFC 1701: Generic Routing Encapsulation (GRE) (Available at ftp://ftp.isi.edu/in-notes/rfc1701.txt); Stan Hanks, Tony Li, Dino Farinacci, and Paul Traina; Oct. 1994; pp. 1-8.
RFC 1702: Generic Routing Encapsulation over IPv4 networks (Available at ftp://ftp.isi.edu/in-notes/rfc1702.txt); Stan Hanks, Tony Li, Dino Farinacci, and Paul Traina; Oct. 1994; pp. 1-4.
RFC 1717: The PPP Multilink Protocol (MP) (Available at ftp://ftp.isi.edu/in-notes/rfc1717.txt); Keith Sklower, Brian Lloyd, Glenn McGregor, and Dave Carr; Nov. 1994; pp. 1-21.
RFC 1739: A Primer on Internet and TCP/IP Tools (Available at ftp://ftp.isi.edu/in-notes/rfc1739.txt); Gary C. Kessler and Steven D. Shepard; Dec. 1994; pp. 1-46.
RFC 1752: The Recommendation for the IP Next Generation Protocol (Available at ftp://ftp.isi.edu/in-notes/rfc1752.txt); Scott Bradner and Allison Mankin; Jan. 1995; pp. 1-52.
RFC 1755: ATM Signaling Support for IP over ATM (Available at ftp://ftp.isi.edu/in-notes/rfc1755.txt);Maryann Perez Maher, Fong-Ching Liaw, and Allison Mankin; Feb. 1995; pp. 1-32.
RFC 1762: The PPP DECnet Phase IV Control Protocol (DNCP) (Available at ftp://ftp.isi.edu/in-notes/rfc1762.txt); Steven J. Senum; Mar. 1995; pp. 1-7.
RFC 1763: The PPP Banyan Vines Control Protocol (BVCP) (Available at ftp://ftp.isi.edu/in-notes/rfc1763.txt); Steven J. Senum; Mar. 1995; pp. 1-10.
RFC 1814: Unique Addresses are Good (Available at ftp://ftp.isi.edu/in-notes/rfc1814.txt); Elise Gerich; Jun. 1995; pp. 1-3.
RFC 1825: Security Architecture for the Internet Protocol (Available at ftp://ftp.isi.edu/in-notes/rfc1825.txt); Randall Atkinson; Aug. 1995; pp. 1-22.
RFC 1826: IP Authentication Header (Available at ftp://ftp.isi.edu/in-notes/rfc1826.txt); Randall Atkinson; Aug. 1995; pp. 1-13.
RFC 1827: IP Encapsulating Security Payload (ESP) (Available at ftp://ftp.isi.edu/in-notes/rfc1827.txt); Randall Atkinson; Aug. 1995; pp. 1-12.
RFC 1841: PPP Network Control Protocol for LAN Extension (Available at ftp://ftp.isi.edu/in-notes/rfc1841.txt); Joelle Bafile Chapman, Dave Coli, Andy Harvey, Bent Jensen, and Kevin Rowett; Sep. 1995; pp. 1-66.
RFC 1853: IP in IP Tunneling (Available at ftp://ftp.isi.edu/in-notes/rfc1853.txt); William Allen Simpson; Oct. 1995; pp. 1-8.
RFC 1877: PPP Internet Protocol Control Protocol Extensions for Name Server Addresses (Available at ftp://ftp.isi.edu/in-notes/rfc1877.txt); Steve Cobb; Dec. 1995; pp. 1-6.
RFC 1883: Internet Protocol, Version 6 (IPv6) Specification (Available at ftp://ftp.isi.edu/in-notes/rfc1883.txt); Stephen E. Deering and Robert M. Hinden; Dec. 1995; pp. 1-37.
RFC 1884: IP Version 6 Addressing Architecture (Available at ftp://ftp.isi.edu/in-notes/rfc1884.txt); Robert M. Hinden and Stephen E. Deering, Editors; Dec. 1995; pp. 1-18.
RFC 1887: An Architecture for IPv6 Unicast Address Allocation (Available at ftp://ftp.isi.edu/in-notes/rfc1887.txt); Yakov Rekhter and Tony Li, Editors; Dec. 1995; pp. 1-26.
RFC 1897: IPv6 Testing Address Allocation (Available at ftp://ftp.isi.edu/in-notes/rfc1897.txt); Robert M. Hinden and Jon Postel; Jan. 1996; pp. 1-4.
RFC 1918: Address Allocation for Private Internets (Available at ftp://ftp.isi.edu/in-notes/rfc1918.txt); Yakov Rekhter, Robert G Moskowitz, Daniel Karrenberg, Geert Jan de Groot, and Eliot Lear; Feb. 1996; pp. 1-9.
RFC 1919: Classical versus Transparent IP Proxies (Available at ftp://ftp.isi.edu/in-notes/rfc1919.txt); Marc Chatel; Mar. 1996; pp. 1-35.
RFC 1928: SOCKS Protocol Version 5 (Available at ftp://ftp.isi.edu/in-notes/rfc1928.txt); Marcus Leech, M. Ganis, Y. Lee, R. Kuris, D. Koblas, and L. Jones; Mar. 1996; pp. 1-9.
RFC 1929: Username/Password Authentication for SOCKS V5 (Available at ftp://ftp.isi.edu/in-notes/rfc1929.txt); Marcus Leech; Mar. 1996; pp. 1-2.
RFC 1932: IP over ATM: A Framework Document (Available at ftp://ftp.isi.edu/in-notes/rfc1932.txt); Robert G. Cole, David H. Shur, and Curtis Villamizar; Apr. 1996; pp. 1-31.

RFC 1933: Transition Mechanisms for IPv6 Hosts and Routers (Available at ftp://ftp.isi.edu/in-notes/rfc1933.txt); Robert E. Gilligan and Erik Nordmark; Apr. 1996; pp. 1-22.

RFC 3022: Traditional IP Network Address Translator (Traditional NAT) (Available at ftp://ftp.isi.edu/in-notes/rfc3022.txt); Pyda Srisuresh and Kjeld Borch Egevang; Jan. 2001; pp. 1-16.

RFC 3027: Protocol Complications with the IP Network Address Translator (Available at ftp://ftp.isi.edu/in-notes/rfc3027.txt); Matt Holdrege and Pyda Srisuresh;Jan. 2001; pp. 1-20.

RFC 3031: Multiprotocol Label Switching Architecture (Available at ftp://ftp.isi.edu/in-notes/rfc3031.txt); Eric C. Rosen, Arun Viswanathan, and Ross Callon; Jan. 2001; pp. 1-61.

RFC 3032: MPLS Label Stack Encoding (Available at ftp://ftp.isi.edu/in-notes/rfc3032.txt); Eric C. Rosen, Dan Tappan, Yakov Rekhter, Guy Fedorkow, Dino Farinacci, Tony Li, and Alex Conta; Jan. 2001; pp. 1-23.

RFC 3034: Use of Label Switching on Frame Relay Networks Specification (Available at ftp://ftp.isi.edu/in-notes/rfc3034.txt); Alex Conta, Paul Doolan, and Andrew G. Malis; Jan. 2001; pp. 1-24.

RFC 3035: MPLS using LDP and ATM VC Switching (Available at ftp://ftp.isi.edu/in-notes/rfc3035.txt); Bruce Davie, Paul Doolan, Jeremy Lawrence, Keith McCloghrie, Yakov Rekhter, Eric Rosen, and George Swallow; Jan. 2001; pp. 1-20.

RFC 3053: IPv6 Tunnel Broker (Available at ftp://ftp.isi.edu/in-notes/rfc3053.txt); Alain Durand, Paolo Fasano, Ivano Guardini, and Domenico Lento; Jan. 2001; pp. 1-13.

RFC 3056: Connection of IPv6 Domains via IPv4 Clouds (Available at ftp://ftp.isi.edu/in-notes/rfc3056.txt); Brian E. Carpenter and Keith Moore; Feb. 2001; pp. 1-23.

RFC 3057: ISDN Q.921—User Adaptation Layer (Available at ftp://ftp.isi.edu/in-notes/rfc3057.txt); Ken Morneault, Malleswar Kalla, Selvam Rengasami, and Greg Sidebottom; Feb. 2001; pp. 1-66.

RFC 3070: Layer Two Tunneling Protocol (L2TP) over Frame Relay (Available at ftp://ftp.isi.edu/in-notes/rfc3070.txt); Vipin Rawat, Rene Tio, Rohit Verma, and Suhail Nanji; Feb. 2001; pp. 1-7.

RFC 3077: A Link-Layer Tunneling Mechanism for Unidirectional Links (Available at ftp://ftp.isi.edu/in-notes/rfc3077.txt); Emmanuel Duros, Walid Dabbous, Hidetaka Izumiyama, Noboru Fujii, and Yongguang Zhang; Mar. 2001; pp. 1-25.

RFC 3089: A SOCKS-based IPv6/IPv4 Gateway Mechanism (Available at ftp://ftp.isi.edu/in-notes/rfc3089.txt); Hiroshi Kitamura; Apr. 2001; pp. 1-12.

RFC 3102: Realm Specific IP: Framework (Available at ftp://ftp.isi.edu/in-notes/rfc3102.txt); Michael Borella, Jeffrey Lo, David Grabelsky, and Gabriel E. Montenegro; Oct. 2001; pp. 1-30.

RFC 3103: Realm Specific IP: Protocol Specification (Available at ftp://ftp.isi.edu/in-notes/rfc3103.txt); Michael Borella, David Grabelsky, Jeffrey Lo, and Kunihiro Taniguchi; Oct. 2001; pp. 1-54.

RFC 3104: RSIP Support for End-to-end IPsec (Available at ftp://ftp.isi.edu/in-notes/rfc3104.txt); Gabriel E. Montenegro and Michael Borella; Oct. 2001; pp. 1-19.

RFC 3105: Finding an RSIP Server with SLP (Available at ftp://ftp.isi.edu/in-notes/rfc3105.txt); James Kempf and Gabriel E. Montenegro; Oct. 2001; pp. 1-11.

RFC 3116: Methodology for ATM Benchmarking (Available at ftp://ftp.isi.edu/in-notes/rfc3116.txt); Jeffrey Dunn and Cynthia Martin; Jun. 2001; pp. 1-27.

RFC 3122: Extensions to IPv6 Neighbor Discovery for Inverse Discovery Specification (Available at ftp://ftp.isi.edu/in-notes/rfc3122.txt); Alex Conta; Jun. 2001; pp. 1-20.

RFC 2471: IPv6 Testing Address Allocation (Available at ftp://ftp.isi.edu/in-notes/rfc2471.txt); Robert M. Hinden, Robert Fink, and Jon Postel; Dec. 1998; pp. 1-5.

RFC 2472: IP Version 6 over PPP (Available at ftp://ftp.isi.edu/in-notes/rfc2472.txt); Dimitry Haskin and Ed Allen; Dec. 1998; pp. 1-14.

RFC 2473: Generic Packet Tunneling in IPv6 Specification (Available at ftp://ftp.isi.edu/in-notes/rfc2473.txt); Alex Conta and Stephen Deering; Dec. 1998; pp. 1-36.

RFC 2492: IPv6 over ATM Networks (Available at ftp://ftp.isi.edu/in-notes/rfc2492.txt); Grenville Armitage and Peter Schulter; Jan. 1999; pp. 1-12.

RFC 2497: Transmission of IPv6 Packets over ARCnet Networks (Available at ftp://ftp.isi.edu/in-notes/rfc2497.txt); Ignatios Souvatzis; Jan. 1999; pp. 1-6.

RFC 2507: IP Header Compression (Available at ftp://ftp.isi.edu/in-notes/rfc2507.txt); Mikael Degermark, Bjorn Nordgren, and Stephen Pink; Feb. 1999; pp. 1-47.

RFC 2509: IP Header Compression over PPP (Available at ftp://ftp.isi.edu/in-notes/rfc2509.txt); Mathias Engan, Stephen L. Casner, and Carsten Bormann; Feb. 1999; pp. 1-10.

RFC 2516: A Method for Transmitting PPP Over Ethernet (PPPoE) (Available at ftp://ftp.isi.edu/in-notes/rfc2516.txt); Louis Mamakos, Kurt Lidl, Jeff Evarts, David Carrel, Dan Simone, and Ross Wheeler; Feb. 1999; pp. 1-17.

RFC 2521: ICMP Security Failures Messages (Available at ftp://ftp.isi.edu/in-notes/rfc2521.txt); Phil Karn and William Allen Simpson; Mar. 1999; pp. 1-7.

RFC 2526: Reserved IPv6 Subnet Anycast Addresses (Available at ftp://ftp.isi.edu/in-notes/rfc2526.txt); David B. Johnson and Stephen E. Deering; Mar. 1999; pp. 1-7.

RFC 2816: A Framework for Integrated Services Over Shared and Switched IEEE 802 LAN Technologies (Available at ftp://ftp.isi.edu/in-notes/rfc2816.txt); Anoop Ghanwani, Wayne Pace, Vijay Srinivasan, Andrew Smith, and Mick Seaman; May 2000; pp. 1-47.

RFC 2823: PPP over Simple Data Link (SDL) using SONET/SDH with ATM-like framing (Available at ftp://ftp.isi.edu/in-notes/rfc2823.txt); James Carlson, Paul Langner, Enrique J. Hernandez-Valencia, and James Manchester; May 2000; pp. 1-28.

RFC 2878: PPP Bridging Control Protocol (BCP) (Available at ftp://ftp.isi.edu/in-notes/rfc2878.txt); Mitsuru Higashiyama and Fred Baker; Jul. 2000; pp. 1-38.

RFC 2889: Benchmarking Methodology for LAN Switching Devices (Available at ftp://ftp.isi.edu/in-notes/rfc2889.txt); Robert Mandeville and Jerry Perser; Aug. 2000; pp. 1-35.

RFC 2893: Transition Mechanisms for IPv6 Hosts and Routers (Available at ftp://ftp.isi.edu/in-notes/rfc2893.txt); Robert E. Gilligan and Erik Nordmark; Aug. 2000; pp. 1-29.

RFC 2917: A Core MPLS IP VPN Architecture (Available at ftp://ftp.isi.edu/in-notes/rfc2917.txt); Karthik Muthukrishnan and Andrew Malis; Sep. 2000; pp. 1-16.

RFC 2960: Stream Control Transmission Protocol (Available at ftp://ftp.isi.edu/in-notes/rfc2960.txt); Randall R. Stewart, Qiaobing Xie, Ken Morneault, Chip Sharp, Hanns Juergen Schwarzbauer, Tom Taylor, Ian Rytina, Malleswar Kalla, Lixia Zhang, and Vern Paxson; Oct. 2000; pp. 1-134.

RFC 2962: An SNMP Application Level Gateway for Payload Address Translation (Available at ftp://ftp.isi.edu/in-notes/rfc2962.txt); Danny Raz, Juergen Schoenwaelder, and Binay Sugla; Oct. 2000; pp. 1-20.

RFC 760: DOD Standard Internet Protocol (Available at ftp://ftp.isi.edu/in-notes/rfc760.txt) V; Jan. 1980; pp. i-iii, 1-42.

RFC 777: Internet Control Message Protocol (Available at ftp://ftp.isi.edu/in-notes/rfc777.txt); Jon Postel; Apr. 1981; pp. 1-14.

RFC 787: Connectionless Data Transmission Survey/Tutorial (Available at ftp://ftp.isi.edu/in-notes/rfc787.txt); A. Lyman Chapin; May 22, 1981; pp. 1-41.

RFC 791: Internet Protocol: DARPA Internet Program Protocol Specification (Available at ftp://ftp.isi.edu/in-notes/rfc791.txt); The Information Sciences Institute of the University of Southern California; Editor: Jon Postel; Sep. 1981; pp. i-iii, 1-45.

RFC 874: A Critique of X.25 (Available at ftp://ftp.isi.edu/in-notes/rfc874.txt); M. A. Padlipsky; Sep. 1982; pp. i, 1-13.

RFC 877: A Standard for the Transmission of IP Datagrams Over Public Data Networks (Available at ftp://ftp.isi.edu/in-notes/rfc877.txt); J. T. Korb; Sep. 1983; pp. 1-2.

RFC 894: A Standard for the Transmission of IP Datagrams over Ethernet Networks (Available at ftp://ftp.isi.edu/in-notes/rfc894.txt); Charles Hornig; Apr. 1984; pp. 1-3.

RFC 895: A Standard for the Transmission of IP Datagrams over Experimental Ethernet Networks (Available at ftp://ftp.isi.edu/in-notes/rfc895.txt); Jon Postel; Apr. 1984; pp. 1-3.

RFC 948: Two Methods for the Transmission of IP Datagrams over IEEE 802.3 Networks (Available at ftp://ftp.isi.edu/in-notes/rfc948.txt); Ira Winston; Jun. 1985; pp. 0-5.

RFC 950: Internet Standard Subnetting Procedure (Available at ftp://ftp.isi.edu/in-notes/rfc950.txt); J. Mogul and Jon Postel; Aug. 1985; pp. 1-18.
RFC 1009: Requirements for Internet Gateways (Available at ftp://ftp.isi.edu/in-notes/rfc1009.txt); Robert Braden and Jon Postel; Jun. 1987; pp. 1-55.
RFC 1042: A Standard for the Transmission of IP Datagrams over IEEE 802 Networks (Available at ftp://ftp.isi.edu/in-notes/rfc1042.txt); Jon Postel and J. Reynolds; Feb. 1988; pp. 1-15.
RFC 1051: A Standard for the Transmission of IP Datagrams and ARP Packets over ARCNET Networks (Available at ftp://ftp.isi.edu/in-notes/rfc1051.txt); P. Prindeville; Mar. 1988; pp. 1-4.
RFC 1053: Telnet X.3 PAD Option (Available at ftp://ftp.isi.edu/in-notes/rfc1053.txt); S. Levy and T. Jacobson; Apr. 1988; pp. 1-21.
RFC 1055: A Nonstandard for Transmission of IP Datagrams Over Serial Lines: SLIP (Available at ftp://ftp.isi.edu/in-notes/rfc1055.txt); J. Romkey; Jun. 1988; pp. 1-6.
RFC 1086: ISO-TP0 bridge between TCP and X.25 (Available at ftp://ftp.isi.edu/in-notes/rfc1086.txt); Julian P. Onions and Marshall Rose; Dec. 1988; pp. 1-9.
RFC 1088: A Standard for the Transmission of IP Datagrams over NetBIOS Networks (Available at ftp://ftp.isi.edu/in-notes/rfc1088.txt); Leo J. McLaughlin III; Feb. 1989; pp. 1-3.
RFC 1700: Assigned Numbers (Available at ftp://ftp.isi.edu/in-notes/rfc1700.txt); Joyce K. Reynolds and Jon Postel; Oct. 1994; pp. 1-230.
RFC 2328: OSPF Version 2 (Available at www.ietf.org/rfc/rfc2328.txt); J. Moy; Apr. 1998; pp. 1-204.
RFC 2453: RIP Version 2 (Available at www.ietf.org/rfc/rfc2453.txt); G. Malkin; Nov. 1998; pp. 1-39.
RFC 3377: Lightweight Directory Access Protocol (v3): Technical Specification; (Available at www.ietf.org/rfc/rfc3377.txt); J. Hodges; Sep. 2002; pp. 1-6.
RFC 1035: Domain Names—Implementation and Specification; (Available at www.ietf.org/rfc/rfc1035.txt); P. Mockapetris; Nov. 1987; pp. 1-52.
RFC 2341: Cisco Layer Two Forwarding (Protocol) "L2F" (Available at ftp://ftp.isi.edu/in-notes/rfc2341.txt); Tim Kolar, Morgan Littlewood, and Andy Valencia; May 1998; pp. 1-29.
RFC 2356: Sun's SKIP Firewall Traversal for Mobile IP (Available at ftp://ftp.isi.edu/in-notes/rfc2356.txt); Gabriel E. Montenegro and Vipul Gupta; Jun. 1998; pp. 1-24.
RFC 2363: PPP Over FUNI (Available at ftp://ftp.isi.edu/in-notes/rfc2363.txt); George Gross, Manu Kaycee, Arthur Lin, Andrew Malis, and John Stephens; Jul. 1998; pp. 1-12.
RFC 2364: PPP Over AAL5 (Available at ftp://ftp.isi.edu/in-notes/rfc2364.txt); George Gross, Manu Kaycee, Arthur Lin, Andrew Malis, and John Stephens; Jul. 1998; pp. 1-12.
RFC 2373: IP Version 6 Addressing Architecture (Available at ftp://ftp.isi.edu/in-notes/rfc2373.txt); Robert M. Hinden and Stephen E. Deering; Jul. 1998; pp. 1-26.
RFC 2374: An IPv6 Aggregatable Global Unicast Address Format (Available at ftp://ftp.isi.edu/in-notes/rfc2374.txt); Robert M. Hinden, Mike O'Dell, and Stephen E. Deering; Jul. 1998; pp. 1-12.
RFC 2390: Inverse Address Resolution Protocol (Available at ftp://ftp.isi.edu/in-notes/rfc2390.txt); Terry Bradley, Caralyn Brown, and Andrew Malis; Sep. 1998; pp. 1-10.
RFC 2391: Load Sharing using IP Network Address Translation (LSNAT) (Available at ftp://ftp.isi.edu/in-notes/rfc2391.txt); Pyda Srisuresh and Der-hwa Gan; Aug. 1998; pp. 1-18.
RFC 2401: Security Architecture for the Internet Protocol (Available at ftp://ftp.isi.edu/in-notes/rfc2401.txt); Stephen Kent and Randall Atkinson; Nov. 1998; pp. 1-66.
RFC 2402: IP Authentication Header (Available at ftp://ftp.isi.edu/in-notes/rfc2402.txt); Stephen Kent and Randall Atkinson; Nov. 1998; pp. 1-22.
RFC 2406: IP Encapsulating Security Payload (ESP) (Available at ftp://ftp.isi.edu/in-notes/rfc2406.txt); Stephen Kent and Randall Atkinson; Nov. 1998; pp. 1-22.
RFC 2411: IP Security Document Roadmap (Available at ftp://ftp.isi.edu/in-notes/rfc2411.txt); Rodney Thayer, Naganand Doraswamy, and Rob Glenn; Nov. 1998; pp. 1-11.
RFC 2427: Multiprotocol Interconnect over Frame Relay (Available at ftp://ftp.isi.edu/in-notes/rfc2427.txt); Caralyn Brown and Andrew Malis; Sep. 1998; pp. 1-34.
RFC 2428: FTP Extensions for IPv6 and NATs (Available at ftp://ftp.isi.edu/in-notes/rfc2428.txt); Mark Allman, Shawn Ostermann, and Craig Metz; Sep. 1998; pp. 1-8.
RFC 2460: Internet Protocol, Version 6 (IPv6) Specification (Available at ftp://ftp.isi.edu/in-notes/rfc2460.txt); Stephen E. Deering and Robert M. Hinden; Dec. 1998; pp. 1-39.
RFC 2461: Neighbor Discovery for IP Version 6 (IPv6) (Available at ftp://ftp.isi.edu/in-notes/rfc2461.txt); Thomas Narten, Erik Nordmark, and William Allen Simpson; Dec. 1998; pp. 1-93.
RFC 2464: Transmission of IPv6 Packets over Ethernet Networks (Available at ftp://ftp.isi.edu/in-notes/rfc2464.txt); Matt Crawford; Dec. 1998; pp. 1-7.
RFC 1090: SMTP on X.25 (Available at ftp://ftp.isi.edu/in-notes/rfc1090.txt); Robert Ullmann; Feb. 1989; pp. 1-4.
RFC 1103: A Proposed Standard for the Transmission of IP Datagrams over FDDI Networks (Available at ftp://ftp.isi.edu/in-notes/rfc1103.txt); Dave Katz; Jun. 1989; pp. 1-9.
RFC 1663: PPP Reliable Transmission (Available at ftp://ftp.isi.edu/in-notes/rfc1663.txt); Dave Rand; Jul. 1994; pp. 1-8.
RFC 2285: Benchmarking Terminology for LAN Switching Devices (Available at ftp://ftp.isi.edu/in-notes/rfc2285.txt); Robert Mandeville; Feb. 1998; pp. 1-25.
RFC 2290: Mobile-IPv4 Configuration Option for PPP IPCP (Available at ftp://ftp.isi.edu/in-notes/rfc2290.txt); Jim Solomon and Steven Glass; Feb. 1998; pp. 1-17.
RFC 2784: Generic Routing Encapsulation (GRE) (Available at ftp://ftp.isi.edu/in-notes/rfc2784.txt);;Dino Farinacci, Tony Li, Stan Hanks, David Meyer and Paul Traina; Mar. 2000; pp. 1-9.
RFC 2815: Integrated Service Mappings on IEEE 802 Networks (Available at ftp://ftp.isi.edu/in-notes/rfc2815.txt); Mick Seaman, Andrew Smith, Eric Crawley, and John Wroclawski; May 2000; pp. 1-17.
RFC 3437: Layer-Two Tunneling Protocol Extensions for PPP Link Control Protocol Negotiation (Available at ftp://ftp.isi.edu/in-notes/rfc3437.txt); W. Mark Townsley and Bill Palter, Dec. 2002; pp. 1-10.
RFC 3457: Requirements for IPsec Remote Access Scenarios (Available at ftp://ftp.isi.edu/in-notes/rfc3457.txt); Scott Kelly and Sankar Ramamoorthi, Editors; Jan. 2003; pp. 1-31.
RFC 3468: The Multiprotocol Label Switching (MPLS) Working Group decision on MPLS signaling protocols (Available at ftp://ftp.isi.edu/in-notes/rfc3468.txt); Loa Andersson and George Swallow; Feb. 2003; pp. 1-11.
RFC 3484: Default Address Selection for Internet Protocol version 6 (IPv6) (Available at ftp://ftp.isi.edu/in-notes/rfc3484.txt); Richard Draves; Feb. 2003; pp. 1-24.
RFC 3489: STUN—Simple Traversal of User Datagram Protocol (UDP) Through Network Address Translators (NATs) (Available at ftp://ftp.isi.edu/in-notes/rfc3489.txt); Jonathan Rosenberg, Joel Weinberger, Christian Huitema, and Rohan Mahy; Mar. 2003; pp. 1-47.
RFC 3496: Protocol Extension for Support of Asynchronous Transfer Mode (ATM) Service Class-aware Multiprotocol Label Switching (MPLS) Traffic Engineering (Available at ftp://ftp.isi.edu/in-notes/rfc3496.txt); Andrew G. Malis and Tony Hsiao; Mar. 2003; pp. 1-6.
RFC 3511: Benchmarking Methodology for Firewall Performance (Available at ftp://ftp.isi.edu/in-notes/rfc3511.txt); Brooks Hickman, David Newman, Saldju Tadjudin, and Terry Martin; Apr. 2003; pp. 1-34.
RFC 3513: Internet Protocol Version 6 (IPv6) Addressing Architecture (Available at ftp://ftp.isi.edu/in-notes/rfc3513.txt); Robert M. Hinden and Stephen E. Deering; Apr. 2003; pp. 1-26.
RFC 3518: Point-to-Point Protocol (PPP) Bridging Control Protocol (BCP) (Available at ftp://ftp.isi.edu/in-notes/rfc3518.txt); Mitsuru Higashiyama, Fred Baker, and Tawei Liao; Apr. 2003; pp. 1-40.
RFC 3519: Mobile IP Traversal of Network Address Translation (NAT) Devices (Available at ftp://ftp.isi.edu/in-notes/rfc3519.txt); Henrik Levkowetz and Sami Vaarala; Apr. 2003; pp. 1-34.

* cited by examiner

DETERMINATION OF NETWORK PERFORMANCE CHARACTERISTICS

CROSS-REFERENCE TO RELATED PATENT APPLICATIONS

This present application claims priority to several copending U.S. provisional applications that were all filed on Jun. 24, 2002 and also are each incorporated by reference in their entireties herein. The copending U.S. provisional applications, which are incorporated by reference in their entireties herein, and to which priority is claimed, are listed by the following U.S. serial numbers and titles:
  60/391,098—"Auto Topology Discover Method for Layer 3 Networks"
  60/391,121—"Method for Automatic Discovery of Network Core Type"
  60/391,053—"Method for Determination of Virtual Circuit Characteristics in Layer 3 Networks"

Furthermore, the present application is one of three related patent applications that are being filed on the same day. The three patent applications listed U.S. serial numbers and title are the following:
  Ser. No. 10/602,940—"Automatic Discovery of Network Node Addresses"
  Ser. No. 10/603,038—"Automatic Discovery of Network Core Type"
  ser. No. 10/515,222—"Determination of Network Performance Characteristics"

Also, the patent application with U.S. Ser. No. 10/602,940, entitled "Automatic Discovery of Network Node Addresses", and filed the same day is incorporated by reference in its entirety herein. In addition, the patent application with U.S. Ser. No. 10/603,038, entitled "Automatic Discovery of Network Core Type", and filed the same day is incorporated by reference in its entirety herein.

TECHNICAL FIELD

The present disclosure generally is related to network performance measurement and, more particularly, is related to systems and methods for measuring transmission delays through networks.

BACKGROUND

The Transmission Control Protocol/Internet Protocol (TCP/IP) protocol suite normally used on the Internet has included an Internet Message Control Protocol (ICMP) that is commonly used in echo testing or ping and trace route applications. In general, the Internet standard ping or ICMP echo has a request/response format, wherein one device sends an ICMP echo request and another device responds to a received ICMP echo request with a transmitted ICMP echo response. Normally, IP devices are expected to implement the ICMP protocol as part of the support for IP to be able to use ICMP for testing. Internet RFC 792, entitled "Internet Control Message Protocol: DARPA Internet Program Protocol Specification" at least partially describes the behavior of ICMP. The ICMP echo message has a type field, a code field, a checksum field, an identifier field, a sequence number field, and a data field. According to RFC 792, "The data received in the echo message must be returned in the echo reply message." Thus, RFC compliant ping responders or ICMP echo reply message responders are supposed to copy the received data field in an echo request message directly into the data field of the transmitted echo response message.

Furthermore, the primary version of the Internet Protocol (IP) used on the Internet today is known as IP version 4 or IPv4. However, a newer version of IP has been defined and is seeing some use as IP version 6 or IPv6. In addition, there is a newer version of ICMP known as ICMP version 6 or ICMPv6 as described at least partially in RFCs 1885 and 2463, which are both entitled "Internet Control Message Protocol (ICMPv6) for the Internet Protocol Version 6 (IPv6) Specification". According to RFC 2463, "Every [IPv6] node MUST implement an ICMPv6 Echo responder function that receives Echo Requests and sends corresponding Echo Replies. A[n IPv6] node SHOULD also implement an application-layer interface for sending Echo Requests and receiving Echo Replies, for diagnostic purposes." Thus, responding to ICMP echo requests normally is a necessary function in supporting IPv4 and/or IPv6 standards. The ICMPv6 RFCs 1885 and 2464 goes on to specify that the data field of an ICMP echo response contains the "data from the invoking Echo Request message." Therefore, both ICMP and ICMP v6 associated with IPv4 and IPv6, respectively, specify that the data field in an ICMP echo reply message is to essentially contain a copy of the data received in the corresponding ICMP echo request message.

Moreover, the ICMP echo protocol basically is a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting on the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to loopback outbound echo request messages back into the device's own incoming echo request responder processes. IPv6 has a loopback functionality as well.

This copying of data exactly in the ICMP echo response is somewhat wasteful because the responder generally does not convey that much if any information back to the ICMP echo request initiating device. Arguably the initiating device could compute bit error rate (BER) statistics on the transmitted versus the received data field in ICMP echo packets. However, such physical layer issues as BER statistics normally are not as relevant for network layer IP datagranis that already include various error control code mechanisms. Arguably the device running the responding process can communicate information to the device running the initiating process by having the device running the original responding process initiate its own echo request and wait for an echo response from the original initiating device. However, such a solution results in four packets with a first echo request from a local device responded to by a first echo response from a remote device and with a second echo request from the remote device responded to by a second echo response from the local device.

Also, the identifier and/or sequence number in ping packets generally has allowed the ping to be used by a device to determine the round-trip delay from the time an ICMP echo request packet is sent to the time corresponding to when an associated received ICMP echo request is received back at the initiating device. Furthermore, ping packets generally convey little or no information about the type of device initiating the ping.

Moreover, although IPv4 has Type of Service (ToS) fields in the IP datagram, these fields have become more important as the services used over the Internet and networks using Internet technology have grown from basic computer data communication to also include real-time applications such as voice and/or video. Various Type of Service (ToS) in IPv4 and IPv6 have been used in implementing various (Quality of Service) QoS characteristics that are defined for different classes of service and/or service level agreements (SLAs). Furthermore, one skilled in the art will be aware of the differentiated services Internet RFCs as well.

Thus, there exists a need to address some of these and other limitations of the current ICMP echo protocol generally without having an adverse on the large embedded base of IP devices that utilize the standard ICMP and ICMPv6 protocols of today.

SUMMARY

Systems and methods for determining network performance characteristics are disclosed. In general, the systems and methods may be used as enhancements to existing protocols such as, but not limited to, ICMP and ICMPv6. The systems and methods may involve replying to reply messages to support a three-way message communication to measure network performance characteristics.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Also, the flow charts only show one preferred embodiment of steps that may be used in the present invention. One skilled in the art will be aware that flow chart steps may often be performed in different orders and may even be performed in parallel in some cases. All these variations on acceptable orderings of the steps are intended to be with the scope of the present invention.

DETAILED DESCRIPTION

Figure 1:
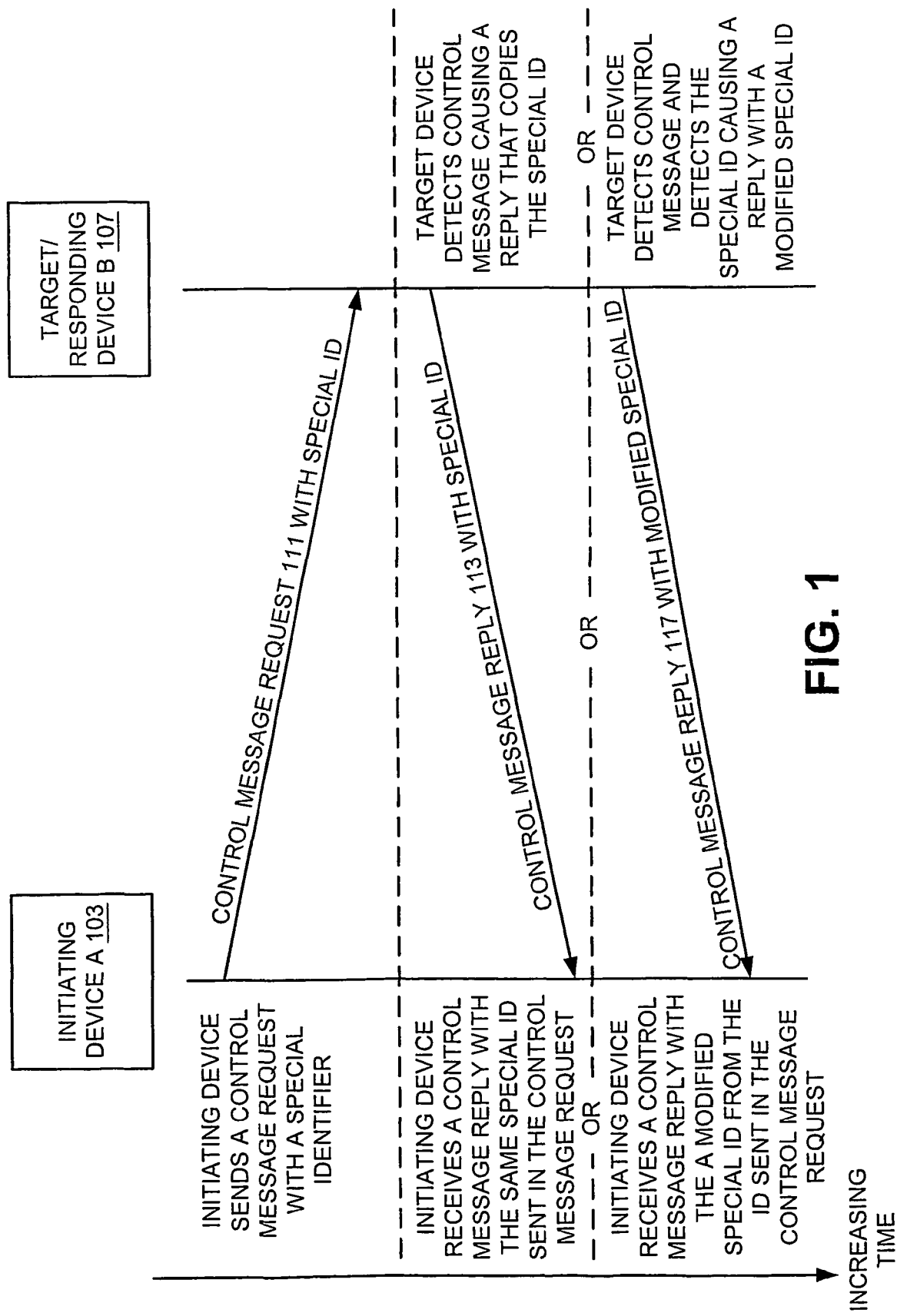
FIG. 1 is a timing diagram comparing the behavior of the current standard ping responder with the ping responder behavior of the preferred embodiments of the present invention.

Although the standard ping protocol of ICMP echo is well known to one of ordinary skill in the art, the following Internet RFCs at least partially describe the ICMP protocol associated with IPv4 and the ICMPv6 protocol associated with IPv6 with each of the following RFCs incorporated by reference in their entireties herein: RFC 760, entitled "DOD Standard Internet Protocol"; RFC 777, entitled "Internet Control Message Protocol"; RFC 791, entitled "Internet Protocol: DARPA Internet Program Protocol Specification"; RFC 792, entitled "Internet Control Message Protocol: DARPA Internet Program Protocol Specification"; RFC 950, entitled "Internet Standard Subnetting Procedure"; RFC 1256, entitled "ICMP Router Discovery Messages"; RFC 1788, entitled "ICMP Domain Name Messages"; RFC 2521, entitled "ICMP Security Failures Messages"; RFC 1739, entitled "A Primer On Internet and TCP/IP Tools"; RFC 2151, entitled "A Primer On Internet and TCP/IP Tools and Utilities"; RFC 1393, entitled "Traceroute Using an IP Option"; RFC 1885, entitled "Internet Control Message Protocol (ICMPv6) for the Internet Protocol Version 6 (IPv6) Specification"; RFC 2463, entitled "Internet Control Message Protocol (ICMPv6) for the Internet Protocol Version 6 (IPv6) Specification"; RFC 1970, entitled "Neighbor Discovery for IP Version 6 (IPv6)"; RFC 2461, entitled "Neighbor Discovery for IP Version 6 (IPv6)"; and RFC 3122, entitled "Extensions to IPv6 Neighbor Discovery for Inverse Discovery Specification".

Furthermore, both Douglas E. Corner and W. Richard Stevens have written multi-volume books on TCP/IP that generally organize and summarize some of the information found in various Internet Request for Comments (RFCs), which generally are the standards documents of the Internet. Specifically, Douglas E. Comer's TCP/IP book volumes generally have been issued in several editions, and "Internetworking with TCP/IP, Volume 1, Fourth Edition" by Douglas E. Corner with ISBN 0130183806 and a listed publication date in 2000 is incorporated by reference in its entirety herein. Furthermore, W. Richard Stevens' three volumes on TCP/IP include "TCP/IP Illustrated, Volume 1: The Protocols" with ISBN 0201633469 and a listed publication date in 1994, which is incorporated in its entirety by reference herein.

As used herein, the standard ping described in the RFCs is known as a two-way ping because the ping process corresponds to communicating a first packet as an ICMP echo request followed by communicating a second packet in a reverse direction as an ICMP reply. The preferred embodiments of the present invention extend the ping or ICMP echo protocol to support the exchange of three echo packets with one request and two responses, while still maintaining backward compatibility with the Internet standard two-way ICMP ping.

In general, the extension to the ping protocol includes the initiating device encoding some information in the ping echo request message that allows a target responding to an initiating device to recognize that the initiating device supports the extended or enhanced ping functionality of the preferred embodiments of the present invention. Several possible non-limiting fields for encoding this special identifier (ID) information include the ICMP echo fields for identifiers, sequence numbers, and/or data as all these fields generally are copied by the ping responding device in generating the echo response message. However, if the target or responding device supports the preferred embodiments of the present invention, then it will recognize that the initiating device has identified its support for the preferred embodiments of the present invention in the incoming ping echo request message. The target/responding device then notifies the initiating device that the target/responding device supports the enhanced operation of the preferred embodiments of the present invention by modifying the echo response message in at least one of the identifier, sequence number, and/or data fields. Although such modification violates the RFC standard ping process, the initiating device has already indicated its support for the enhanced functionality in the original ping echo request message.

FIG. 1 shows this behavior in more detail with an initiating device A 103 and a target/responding device B 107. The initiating device A 103 sends a control message request with a special ID using a protocol such as but, not limited to, ICMP and/or ICMPv6. The target/responding device B 107 may respond in the standard manner of ICMP (and/or ICMPv6) by copying the identifier, sequence number, and data fields to indicate that it does not support enhanced ping operation of the preferred embodiments of the present invention. Alternatively, if the target/responding device B 107 does support the enhanced ping/ICMP echo operation, it responds by altering at least one of the identifier, sequence number, and/or data fields to communicate to the initiating device A 103 that the target does support the enhanced functionality of the preferred embodiments of the present invention. Thus, target/responding device B 107 responds to control message request 111 with either control message reply 113 that is not modified or with control message reply 117 that is modified. The modified special ID of control message 117 indicates to the initiating device A 103 that the target/responding device B 107 does indeed support the enhanced operation of the preferred embodiments of the present invention.

Figure 2:
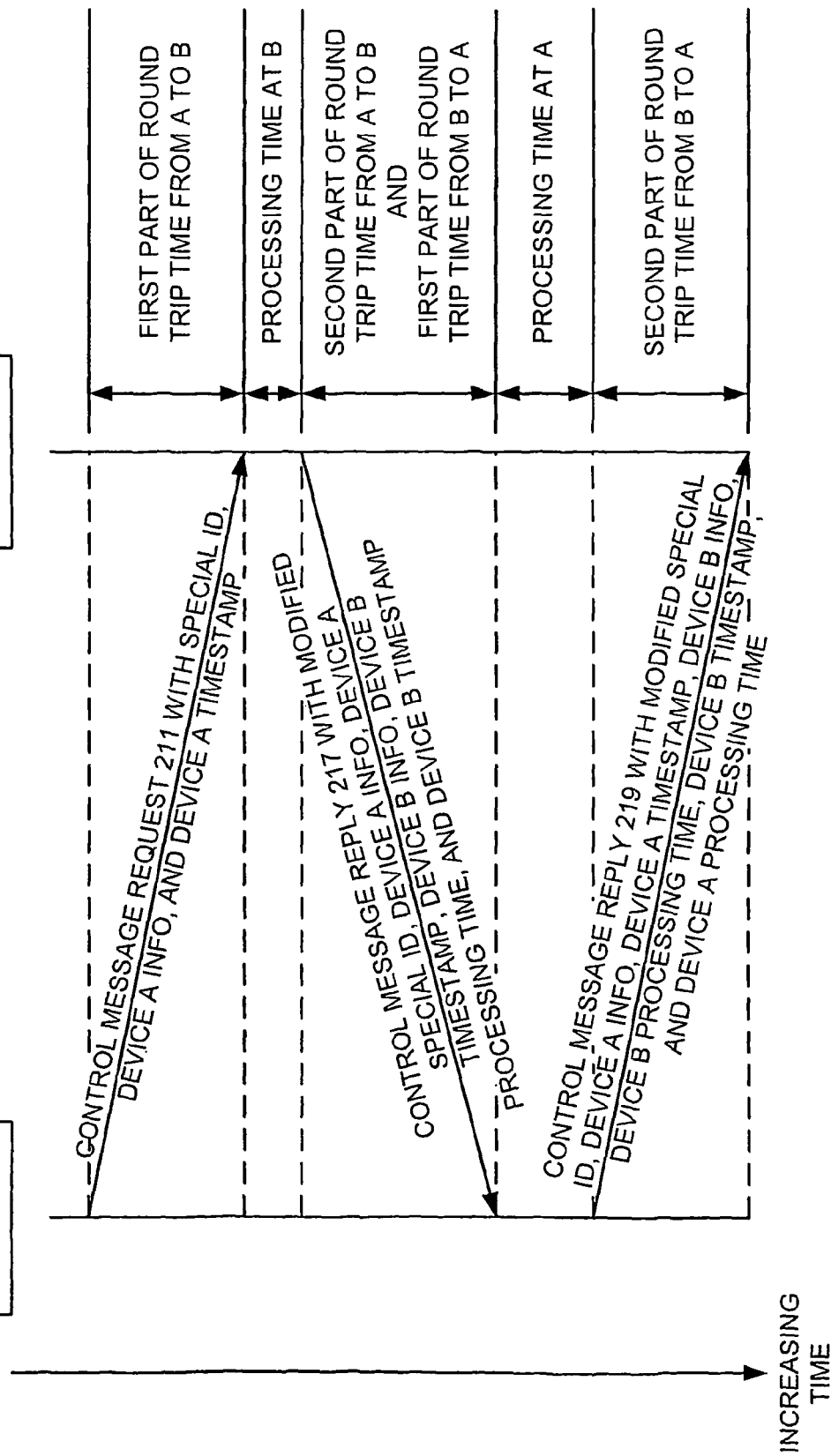
FIG. 2 is a timing diagram showing the packets exchanged in the preferred embodiments of the present invention.

FIG. 2 shows more of the behavior of the enhanced operation of the preferred embodiments of the present invention. In FIG. 2 initiating device A 203 sends a control message request 211 such as, but not limited to, an ICMP echo request, with a special ID. Target/responding device B 207 supports the enhanced operation of the preferred embodiments of the present invention and responds with a control message reply 217 with a modified special ID indicating the support of the enhanced operation of the preferred embodiments. When initiating device A 203 receives a control message reply 217 with the modified special ID, the initiating device A 203 becomes informed that the target/responding device B 207 supports the enhanced processing of the preferred embodiments of the present invention.

This enhanced operation of the preferred embodiments of the present invention allows both the initiating device A 203 and the target/responding device B 207 to inform each other of the support for the enhanced operation. In addition, the mechanism generally is completely backward compatible with the standard RFC ping or ICMP echo. With the knowledge that both the initiating device A 203 and the target/responding device B 207 support the enhanced operation, the standard two-way request response mechanism of ping can be relaxed as can the standard ping requirement that the identifier, sequence number, and data fields are exactly copied in the ICMP response without adding any new information.

Relaxing the requirement on information carried in an ICMP echo message allows the initiating device A 203 to communicate information in the control message request 211 such as, but not limited to, device A information, and device A's timestamp of when the control message was sent. When the target/responding device B 207 receives the control message request 211 from initiating device A 203, it can log its own packet receipt timestamp of device B's (207) clock. When target device B gets ready to send control message reply 217, subtracting device B's clock timestamp at the time of reception from device B's timestamp at the time of transmission will calculate the amount of processing time taken for device B to process the received control message request 211 and generate the control message reply 217. Furthermore, device B 207 has been informed about some addition information on device A 203 in receiving the device A information in the control message request 211. In forming the control message reply 217, device B 207 may include device B information, the processing time taken by device B, and the device B timestamp when the control message reply is generated and/or transmitted.

When device A 203 receives control message reply 217 from device B 207, it gains potentially new information about device B in the device B information. Furthermore, device A 203 is able to accurately calculate the network round trip delay without including the effects of slow processing at device B 207. The round trip network delay from device A to device B and back is equal to the timestamp at which device A received control message reply 217 minus device A's timestamp at which device A sent control message request 211 minus the processing time taken by device B to respond to control message request 211 and generate control message reply 217.

Furthermore, in breaking the standard two-way request-reply paradigm of standard RFC ping, device A 203 can actually reply back to device B's 207 control message reply 217 by sending another control message reply 219. In control message reply 219, device A can now include the processing time taken at device A between receipt of control message reply 217 and generation and/or transmission of control message reply 219. When device B 207 receives control message reply 219 back, device B 207 can accurately calculate the round-trip network delay without including the processing time by taking the time stamp when device B 207 receives control message reply 219 and subtracting both the timestamp when device B 207 sent control message reply 217 and the processing time used by device A that is included in the information contained in control message reply 219.

At the end of this process, both device A 203 and device B 207 have additional information about each other. Some non-limiting examples of the types of device information that might be communicated between devices A 203 and B 207 include, but are not limited to: far end virtual circuit ID, far end device name, far end device type, transmission timestamp, ICMP echo message processing time, and forwarded paths. Furthermore the preferred embodiments of the present invention allow devices A 203 and B 207 to have an accurate measurement of the round trip network performance without the distortion of the processing time taken by the two devices. Standard two-way ping only results in a measurement of the round-trip delay for one device, and the round-trip delay measurement in standard two-way ping generally is less accurate than the preferred embodiments of the present invention because standard two-way ping does not account for processing time delay. In addition, unlike using two standard two-way pings to attempt to obtain the round-trip delay for both devices, only three packets are needed to determine and exchange this information between devices A 203 and B 207, which results in a (3−4)/4=25% reduction in the number of packets.

Moreover, these techniques of the preferred embodiments of the present invention can be applied for each type of service (ToS) or QoS mechanisms that can be encoded in the packets carrying the ICMP. Thus, the preferred embodiments of the present invention can collect network statistics about the performance of various service level agreements and paths with different levels of quality of service (QoS). These types of network performance statistics collection are more and more useful as Internet technology is used to support real-time applications such as voice and video in addition to its historical role of supporting bulk data transmission for less delay sensitive traffic. Also, up-to-date information on current network performance is useful in determining whether additional data flows or streams can be accommodated and admitted into the network without significant performance degradations. Thus, the preferred embodiments of the present invention can provide input into the flow admission control mechanisms of a network.

It should be emphasized that the above-described embodiments are merely possible examples of implementations, which are set forth for a clear understanding of the principles of the invention. Many variations and modifications may be made to the above-described embodiments. All such modifications and variations are intended to be included herein within the scope of this disclosure.

Therefore, having thus described the invention, at least the following is claimed:

1. A method of communicating messages for network testing between an initiating device and a responding device, the method comprising the steps of:
   determining if a first echo reply message received from the responding device includes a modified special ID indicating that the responding device supports an enhanced ping operation, the enhanced ping operation including receiving initiating device processing time information in a second echo reply message responsive to the first echo reply message including the modified special ID; and
   transmitting the second echo reply message including the modified special ID to the responding device responsive to receiving the first echo reply message including the modified special ID.

2. The method of claim 1, further comprising the step of computing at least one network performance characteristic based on responding device processing time information included in the first echo reply message.

3. The method of claim 2, wherein the at least one performance characteristic comprises network transit time.

4. The method of claim 1, wherein the modified special ID is an altered identifier.

5. The method of claim 1, wherein the first echo reply message and the second echo reply message are Internet Control Message Protocol (ICMP) echo reply messages.

6. The method of claim 1, further comprising the step of adding initiating device processing time information to the second echo reply message for receipt by the responding device responsive to the modified special ID.

7. The method of claim 6, wherein initiating device processing time information includes echo message processing time of the initiating device.

8. The method of claim 1, further comprising the step of generating the second echo reply message with the modified special ID responsive to the first echo reply message including the modified special ID before transmitting the second echo reply message.

9. The method of claim 8, wherein generating the second echo reply message including the modified special ID comprises copying the modified special ID of the first echo reply message to the same location in the second echo reply message.

10. A method of communicating messages for network testing between an initiating device and a responding device, the method comprising the steps of:
    determining if an initial message received from the initiating device includes a special ID indicating that the initiating device supports an enhanced ping operation, the enhanced ping operation including transmitting initiating device processing time information in a second echo reply message responsive to a first echo reply message including a modified special ID indicating that the responding device supports the enhanced ping operation, the enhanced ping operation further including receiving the initiating device processing time information in the second echo reply message responsive to the first echo reply message including the modified special ID;
    transmitting the first echo reply message including the modified special ID to the initiating device responsive to receiving the initial message including the special ID; and
    receiving the second echo reply message including the modified special ID from the initiating device, the second echo reply message responsive to the first echo reply message including the modified special ID.

11. The method of claim 10, further comprising the step of generating, if the initial message includes the special ID, the first echo reply message including the modified special ID before transmitting the first echo reply message.

12. The method of claim 11, further comprising the step of adding responding device processing time information to the first echo reply message for receipt by the initiating device responsive to the special ID.

13. The method of claim 12, wherein responding device processing time information includes echo message processing time of the responding device.

14. The method of claim 11, wherein the step of generating the first echo reply message including the modified special ID comprises:
    copying the special ID to the first echo reply message; and
    altering the special ID in the first echo reply message.

15. The method of claim 14, wherein the initial message is an echo request message.

16. The method of claim 15, wherein the special ID of the echo request message is copied to the same location in the first echo reply message.

17. The method of claim 10, further comprising the step of computing at least one network performance characteristic based on initiating device processing time information included in the second echo reply message.

18. The method of claim 17, wherein the at least one performance characteristic comprises network transit time.

19. A system to communicate messages for network testing between an initiating device and a responding device, the system comprising:
    the initiating device configured to determine if a first echo reply message received from the responding device includes a modified special ID indicating that the responding device supports an enhanced ping operation, the enhanced ping operation including receiving initiating device processing time information in a second echo reply message responsive to the first echo reply message including the modified special ID; and
    the initiating device configured to transmit the second echo reply message including the modified special ID to the responding device responsive to receiving the first echo reply message including the modified special ID.

20. The system of claim 19, further comprising the initiating device configured to compute at least one network performance characteristic based on responding device processing time information included in the first echo reply message.

21. The system of claim 20, wherein the at least one performance characteristic comprises network transit time.

22. The system of claim 19, wherein the modified special ID is an altered identifier.

23. The system of claim 19, wherein the network testing varies based on quality of service (QoS).

24. The system of claim 23, wherein the quality of service (QoS) affects at least one real-time application.

25. The system of claim 24, wherein the at least one real-time application is a voice service.

26. The system of claim 19, further comprising the initiating device configured to add initiating device processing time information to the second echo reply message for receipt by the responding device responsive to the modified special ID.

27. The system of claim 26, wherein initiating device processing time information includes echo message processing time of the initiating device.

28. The system of claim 19, further comprising the initiating device configured to generate the second echo reply message with the modified special ID responsive to the first echo reply message including the modified special ID before transmitting the second echo reply message.

29. A system to communicate messages for network testing between an initiating device and a responding device, the system comprising:
  the responding device configured to determine if an initial message received from the initiating device includes a special ID indicating that the initiating device supports an enhanced ping operation, the enhanced ping operation including transmitting initiating device processing time information in a second echo reply message responsive to a first echo reply message including a modified special ID indicating that the responding device supports the enhanced ping operation, the enhanced ping operation further including receiving the initiating device processing time information in the second echo reply message responsive to the first echo reply message including the modified special ID;
  the responding device configured to transmit the first echo reply message including the modified special ID to the initiating device responsive to receiving the initial message including the special ID; and
  the responding device configured to receive the second echo reply message including the modified special ID from the initiating device, the second echo reply message responsive to the first echo reply message including the modified special ID.

30. The system of claim 29, further comprising the responding device configured to generate, if the initial message includes the special ID, the first echo reply message including the modified special ID before transmitting the first echo reply message.

31. The system of claim 30, further comprising the responding device configured to compute at least one network performance characteristic based on initiating device processing time information included in the second echo reply message.

32. The system of claim 31, wherein the at least one performance characteristic comprises network transit time.

33. The system of claim 30, further comprising the responding device configured to add responding device processing time information to the first echo reply message for receipt by the initiating device responsive to the special ID.

34. The system of claim 33, wherein responding device processing time information includes echo message processing time of the responding device.

35. The system of claim 29, wherein the network testing varies based on quality of service (QoS).

36. The system of claim 35, wherein the quality of service (QoS) affects at least one real-time application.

37. The system of claim 36, wherein the at least one real-time application is a video service.

38. A system to communicate messages for network testing between an initiating device and a responding device, the system comprising:
  means for determining if a first echo reply message received from the responding device includes a modified special ID indicating that the responding device supports an enhanced ping operation, the enhanced ping operation including receiving initiating device processing time information in a second echo reply message responsive to the first echo reply message including the modified special ID; and
  means for transmitting the second echo reply message with the modified special ID to the responding device responsive to receiving the first echo reply message including the modified special ID.

39. The system of claim 38, wherein the modified special ID is an altered identifier.

40. The system of claim 38, further comprising means for adding initiating device processing time information to the second echo reply message for receipt by the responding device responsive to the modified special ID.

41. The system of claim 40, wherein initiating device processing time information includes echo message processing time of the initiating device.

42. The system of claim 38, further comprising means for computing at least one network performance characteristic based on responding device processing time information included in the first echo reply message.

43. The system of claim 42, wherein the at least one performance characteristic comprises network transit time.

44. The system of claim 38, wherein the network testing varies based on quality of service (QoS).

45. The system of claim 44, wherein the quality of service (QoS) affects at least one real-time application.

46. The system of claim 45, wherein the at least one real-time application is a voice service.

47. The system of claim 38, further comprising means for generating the second echo reply message with the modified special ID responsive to the first echo reply message including the modified special ID before transmitting the second echo reply message.

48. A system to communicate messages for network testing between an initiating device and a responding device, the system comprising:
  means for determining if an initial message received from the initiating device includes a special ID indicating that the initiating device supports an enhanced ping operation, the enhanced ping operation including transmitting initiating device processing time information in a second echo reply message responsive to a first echo reply message including a modified special ID indicating that the responding device supports the enhanced ping operation, the enhanced ping operation further including receiving the initiating device processing time information in the second echo reply message responsive to the first echo reply message including the modified special ID;
  means for transmitting the first echo reply message including the modified special ID to the initiating device responsive to receiving the initial message including the special ID; and
  means for receiving the second echo reply message including the modified special ID from the initiating device, the second echo reply message responsive to the first echo reply message including the modified special ID.

49. The system of claim 48, further comprising means for generating, if the initial message includes the special ID, the first echo reply message including the modified special ID before transmitting the first echo reply message.

50. The system of claim 49, wherein the means for generating comprises:
   means for copying the special ID to the first echo reply message; and
   means for altering the special ID in the first echo reply message.

51. The system of claim 49, further comprising means for adding responding device processing time information to the first echo reply message for receipt by the initiating device responsive to the special ID.

52. The system of claim 48, further comprising means for computing at least one network performance characteristic based on initiating device processing time information included in the second echo reply message.

53. The system of claim 52, wherein the at least one performance characteristic comprises network transit time.

54. The system of claim 48, wherein the network testing varies based on quality of service (QoS).

55. The system of claim 54, wherein the quality of service (QoS) affects at least one real-time application.

56. The system of claim 55, wherein the at least one real-time application is a voice service.

* * * * *